United States Patent [19]

Kojima et al.

[11] Patent Number: 4,814,897
[45] Date of Patent: Mar. 21, 1989

[54] METHOD AND SYSTEM FOR RETRIEVING VIDEO INFORMATION FROM A NON-CAV TYPE RECORDING DISK IN SPECIAL REPRODUCTION MODES

[75] Inventors: Shin-ichi Kojima; Takashi Okano, both of Tokorozawa, Japan

[73] Assignee: Pioneer Electronic Corporation, Tokyo, Japan

[21] Appl. No.: 22,085

[22] Filed: Mar. 5, 1987

[30] Foreign Application Priority Data

Mar. 6, 1986 [JP] Japan ............................. 61-049779
Oct. 31, 1986 [JP] Japan ............................. 61-260422

[51] Int. Cl.⁴ ............................................. H04N 5/76
[52] U.S. Cl. ....................................... 358/342; 358/338
[58] Field of Search ........................ 358/312, 313, 342; 360/10.1, 10.2, 11.1; 369/32, 43, 44, 45, 46

[56] References Cited

U.S. PATENT DOCUMENTS

| | | | |
|---|---|---|---|
| 4,361,849 | 11/1982 | Bolger | 358/312 |
| 4,430,675 | 2/1984 | Fujime | 358/342 |
| 4,451,857 | 5/1984 | Mikado | 358/312 |
| 4,558,375 | 12/1985 | Sontheimer | 358/342 |
| 4,558,377 | 12/1985 | Collins et al. | 358/312 |
| 4,609,948 | 9/1986 | Okano | 358/338 |
| 4,635,134 | 1/1987 | Sasamura et al. | 358/312 |
| 4,646,278 | 2/1987 | Okano | 369/32 |

*Primary Examiner*—Donald McElheny, Jr.
*Attorney, Agent, or Firm*—Fleit, Jacobson, Cohn & Price

[57] ABSTRACT

Information recorded on a non-CAV type recording disk is detected by a pickup device having an information reading point repeatedly moved during spaced intervals in a radial direction across recording tracks on the disk in response to a special playback operation command. Predetermined portions of the information so picked up, during periods between track jump operations, are entered into a memory device and the stored information read out therefrom to provide playback information for the special playback operation. The information reading point is moved by the track jump operations to positions establishing a time period sufficient to enable stabilization of a time base error in the information, caused by said track jump operations, before entry of the information into the memory is begun.

12 Claims, 5 Drawing Sheets

METHOD AND SYSTEM FOR RETRIEVING VIDEO INFORMATION FROM A NON-CAV TYPE RECORDING DISK IN SPECIAL REPRODUCTION MODES

BACKGROUND OF THE INVENTION

The present invention relates to a method and system for playback of recorded informaton, and more particularly to the playback of information recorded on a disk during a special playback operation.

Video disks for recording video information are so arranged that recesses (referred to as "pits") or protrusions form concentric recording tracks or a spiral recording track on the disk surface. The recorded information extends along the length and the intervals between such pits or protrusions.

From the video disk having the foregoing construction, the information recorded thereon may be picked up and reproduced, for example, by demodulating a pickup signal produced by a light beam reflected or transmitted from the recording surface of the recording disk, the signal being modulated by the presence or absence of the pits. In the device for picking up information from such type of recording disk, a tracking servo system is provided for driving a tracking actuator so that the information reading point of the pickup device accurately traces the information recording track on the recording disk at all times. Generally, such a reading operation of an information reading system includes normal playback during which frames of the video information, each of which includes two fields of video signals, are read out in order. A special playback operation is involved, such as still picture playback wherein the same frame of the video information is read out repeatedly. In such special playback operations, the slow speed playback phase and the fast speed playback phase are enabled by controlling the jump of the information reading point of the pickup device and a method is utilized to open the tracking servo loop while the tracking actuator is positively driven at the same time. The information reading point is thereby moved from the recording track being followed and subsequently brought to another recording track portion to be traced while the servo loop is reclosed. Further, the information recording disk associated with the foregoing type of system, is either of the CAV (Constant Angular Velocity) type on which information is recorded so that the reading of such information is performed while the disk is rotated at a constant angular velocity, or of the CLV type wherein the disk is rotated in order to obtain a constant linear velocity readout. In the case of CAV type disks, any circumferential section of the recording track at some radial location on the disk carries a constant amount of information, e.g. the video information of one frame. Therefore, portions of the recording track on which the information corresponding to vertical synchronizing signals disposed between two adjacent frames are aligned in radial relation to the rotational axis of the recording disk. Therefore, with the CAV type video disks, the synchronizing signal segment of the video signal is regularly reproduced, even immediately after a track jump operation, which is essential for the special playback operations. As a result, the special playback operations can be performed satisfactorily without any difficulty.

In the case of the CLV type disks, the amount of information recorded during one revolution of the disk, i.e. in one circumferential track portion, varies depending on the radial position of the recording disk. In other words, the ratio between the period of one revolution of the disk and the period of one field of the video signal is not maintained at an integer value. For example, video information of one frame is recorded in the innermost recording track section while video information of three frames is recorded in the outermost recording track section. Therefore, with the CLV type disks, the generation of the synchronizing signal segment is affected in the video signal obtained immediately after a track jump operation. Thus, it is difficult to maintain the continuity of the video signal for satisfactory picture reproduction if the track jump operation, essential for the special playback operation is performed. In order to solve such problem, it has been proposed to record the readout video signal in a video memory, and to use as a playback video signal, the video signal readout from the video memory by controlling its read address so as to maintain the regularity of the synchronizing signal.

However, the foregoing proposed solution is not easily achieved. In systems for playback of information recorded on a recording disk, a CCD (Charged Coupled Device) is provided for controlling a spindle motor which rotates the recording disk and to effect time base correction. The frequency of a clock signal supplied to the CCD is varied in accordance with a phase difference between an output signal of a synchronizing signal separator, separating synchronizing signal from a playback video signal and an output of a reference oscillator. By such control of the frequency of the clock signal, the output signals of the synchronizing signal separator and the reference oscillator are synchronized in phase. However, in the case of CLV type disks, wherein the positions of the synchronizing signal are not radially aligned, a non-constant phase error develops between the output signal of the synchronizing signal separator and the reference oscillator in association with the track jump operation. As a result, a certain time period is required before the phase of the playback video signal establishes a predetermined relationship to the phase of the output signal of the reference oscillator. Moreover, when the information reading point is moved radially by a track jump operation, within a short time, over a CLV type disk, a transient response of the CCD and spindle motor occurs to maintain the linear velocity. Therefore, additional time is required for stabilizing such transient response.

As an example of a technique for decreasing the time base error associated with the track jump operation of a CLV type disk, a method is proposed by the inventors of the present application, described in U.S. Pat. No. 4,609,948. However, even with such a method, a time period varying from several milliseconds to ten milliseconds is required in order to absorb the time base error completely. Therefore, it becomes necessary to provide an additional device for correcting the time base error of the signal read out from the memory in order to eliminate the disturbance of the synchronizing signal during a special playback mode or another device for correcting such disturbance before writing of the video signal into the memory is separately required. Thus, a complexity problem arises in the construction of the information playback system.

An object of the present invention is therefore to provide a method and system for playback of recorded information wherein special playback operations are enabled while maintaining the construction of the system relatively simple.

Another object of the present invention is to provide a method and system for playback of information recorded on a non-CAV type recording disk by using a memory device in which the length of the information to be recorded may be determined without regard to the radial direction of movement of the information reading point on the recording disk.

SUMMARY OF THE INVENTION

According to the present invention, a method for playback of information recorded on a non-CAV type recording disk, utilizes a pickup device having an information reading point and a memory device having a memory capacity for recording information corresponding to at least one field of video signal. The information reading point of the pickup device is repeatedly moved by a track jump operation in a radial direction along the recording disk, at spaced intervals, across recording tracks on the recording disk in response to a command corresponding to a special playback operation. The spacing between intervals during which radial movement is imparted to the information reading point, is equal to a real number (N) of rotational movements imparted to the recording disk. The radial distance traveled by the information reading point during each of such intervals, crosses M recording tracks on the recording disk, M being a multiple of N.

Predetermined portions of the information picked up by the pickup device are written, during periods between each of the track jump operations, into the memory device, in order. Information stored in the memory device is read out in succession, to provide playback information for the special playback operation.

According to another aspect of the invention, the radial direction of movement of the information reading point on the recording disk is determined from data in the command associated with the special playback operation. The special playback operation involves a still picture playback and return movement imparted to the information reading point of the pickup device across N recording tracks by the track jump operations, repeatedly at intervals of N as hereinbefore defined.

According to another aspect of the invention, the information reading point of the pickup device is radially moved in a forward direction across N (K+1) recording tracks by the track jump operations, repeatedly, at intervals N. Such radial movement of the information reading point occurs while predetermined portions of the information is written into the memory. Radial movement of the information reading point may also occur in a reverse or return direction during a special playback operation at a more rapid reverse speed. Such radial movement of the information reading point in the reverse direction occurs across N (K−1) recording tracks by the repeated track jump operations at intervals of N, while the reading and writing operations are performed simultaneously.

According to yet another aspect of the invention, the information reading point is operatively moved by the track jump operations to a position on the recording track so determined that a time period required for stabilization of a time base error in the information caused by the track jump operations, is established before writing of the information into the memory is begun.

According to other aspects of the invention, the number of disk rotations N between radial movement intervals is varied in accordance with the position of the information reading point along the radial direction on the information recording disk.

According to still further aspects of the invention, information is recorded on a non-CAV type recording disk and a pickup device is provided having an information reading point. A memory device is also provided having a memory capacity for recording information corresponding to at least one field of video signal. The information reading point of the pickup device is radially moved by the repeated track jump operations in response to the special playback command. Means for writing predetermined portions of the information picked up by the pickup device are written, during periods between each of the track jump operations, into the memory device, in order. The information so stored in the memory device is read out in succession, to provide playback information for the special playback operation.

BRIEF DESCRIPTION OF THE DRAWING FIGURES

FIGS. 2(A) and (B) and 3(A) and (B) are diagrams showing operation of the system corresponding to that of FIG. 1.

FIG. 7, (A)–(C), is a schematic diagram of the track jump operation for special playback in connection with a CAV type video disk.

DETAILED DESCRIPTION OF THE PREFERRED EMBODIMENTS

Figure 1:
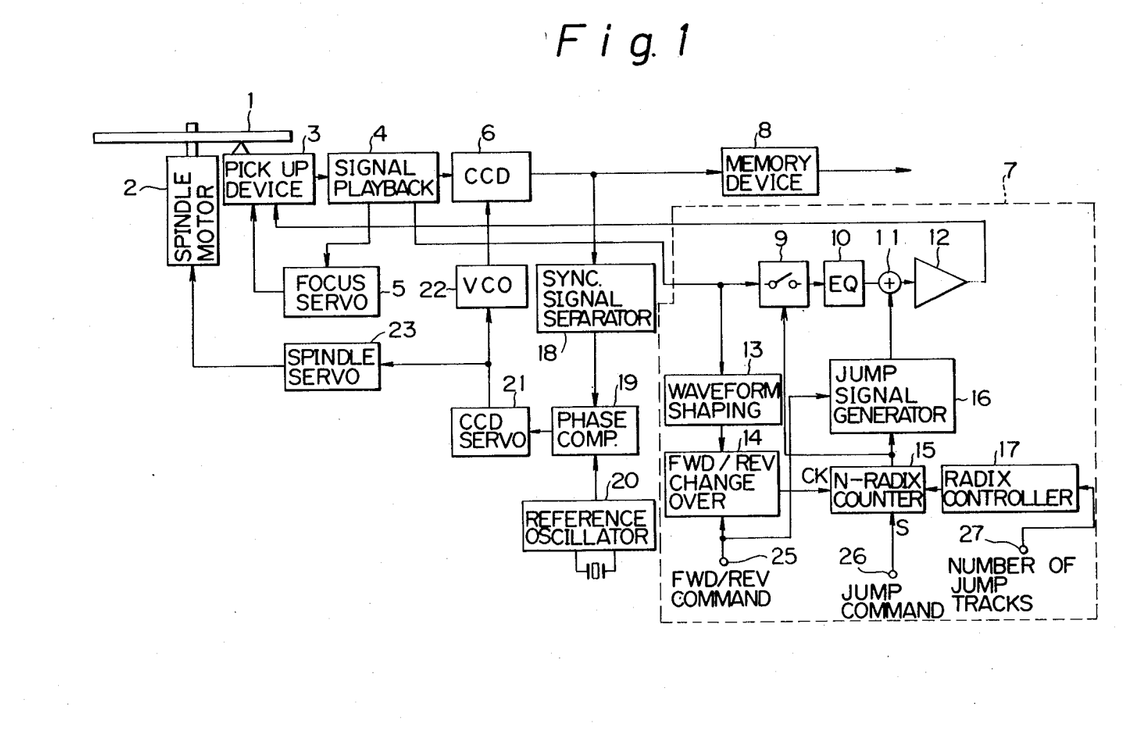
FIG. 1 is a block diagram of an information playback system in accordance with one embodiment of the present invention.

With reference to the accompanying drawings, FIG. 1 relates to a system in which information is recorded on a recording disk 1 rotated by a spindle motor 2, such information being picked up by means of an optical pickup device 3. The pickup device 3 includes various components such as a laser diode, an objective lens, a focus actuator, a tracking actuator, and a photo detector. An output signal of the pickup device 3 is supplied to a signal playback circuit 4. The signal playback circuit 4 is made up of such circuit elements as an RF amplifier, an amplifier for generating servo error signals and a demodulator. In cooperation with such circuit components, the signal playback circuit 4 demodulates the input signal to produce a video signal, and at the same time, generates various error signals for controlling various servo control operations.

The error signals generated by the signal playback circuit 4 are supplied to a focus servo circuit 5 and a tracking servo circuit 7. The focus servo circuit is arranged to drive the focus actuator in the pickup device 3 in response to a focus error signal. The playback video signal supplied by the signal playback circuit, on the other hand, is fed to a memory device 8 and a synchronizing separator 18 through a CCD 6 for time base error correction purposes. The memory device 8, for example, includes a memory having a memory capacity for storing two frames of the video signal, and a control circuit for operating an address control of the memory.

A synchronizing signal is separated from the playback video signal by the synchronizing signal separator 18 and is compared with a reference signal generated by a reference oscillator 20 at a phase comparator 19. By means of the phase comparator, a signal corresponding to a phase difference between the synchronizing signal of the playback video signal and the reference signal is produced. Such phase difference signal generated by the phase comparator 19 is supplied to a CCD servo amplifier 21. An output signal of the CCD servo amplifier 21 operates as a control signal for a VCO (Voltage Controlled Oscillator) and as a drive signal for the spindle motor 2 after passing through a spindle servo amplifier 23. An output signal of the VCO 22 is supplied to the CCD 6 as a clock input. The signal delay time of the CCD 6 is varied in response to changes in oscillation frequency of the VCO 22 in accordance with the phase difference between the synchronizing signal portion of the playback video signal and the reference signal. As a result of such operations, the rotational speed of the spindle motor 2 and the signal delay time of the CCD 6 are controlled so that the phase of the synchronizing signal portion of the playback video signal and the phase of the reference signal become equal to one another.

In the tracking servo circuit 7 as diagrammed in FIG. 1, the tracking error signal is supplied to an equalizer amplifier 10 through a loop switch 9 so that a phase compensation signal is supplied to an adder circuit 11 as an input thereto. An output signal of the adder circuit 11 is supplied through amplifier 12 to the tracking actuator in the pickup device 3, so that the information reading point of the pickup 3 accurately traces the recording track.

At the same time, the tracking error signal is converted to a pulse form signal at a wave form shaping circuit 13 and in turn supplied to an FWD/REV changeover circuit 14 which effects a phase inversion of the pulse form signal in response to a FWD (forward)-/REV (reverse) playback command from source 25. This circuit 14 equalizes the tracking error signal in the forward direction with the tracking error signal in reverse direction because of the 180 degree difference in phase between the forward and reverse direction of the tracking error. An output pulse signal of the FWD/REV changeover circuit 14 is supplied to a counter 15 as a clock input thereto. The counter 15 is a variable radix (base) type counter which starts the count operation in response to a jump command signal supplied from outside source 26. The radix of counter 15 is changed by an external control signal from a radix controller 17. The radix of the counter 15 is so controlled that it operates as an N-radix notation counter, and for example, produces a high level output signal until N pulses are received after the start of the count operation. By the output signal of this counter 15, an on-off control of the loop switch 9 is performed and a jump signal generating circuit 16 is activated to generate a drive signal for the track jump operation. The jump signal generating circuit 16 is arranged to generate the drive signal, having a polarity determined by the FWD/REV command signal, depending on the FWD or REV condition. The drive signal generated by this jump generating circuit 16 is supplied to the adder 11, in order to forcibly drive the tracking actuator in the pickup device 3. An output signal of the radix control circuit 17 is supplied to the counter 15 as the radix control signal aforementioned. The radix control circuit 17 is constructed to generate a control signal which corresponds to a number obtained by adding a specific number to the number of the jump tracks which is indicated by data supplied from a control source 27 (similar to the system controller 30 shown in FIG. 4). Preferably, this number of the jump tracks is varied in accordance with the position of the information reading point along the radial direction on the recording disk 1.

In the foregoing information playback system, it is assumed that the tracking servo loop switch 9 is closed, and a normal playback operation is taking place under normal operation of the tracking servo system. In this condition, if still picture playback operation is designated by an operator (user) and jump command signals are generated at the control source 27 at predetermined times within the vertical fly-back signal blanking period and the number of recording tracks in which two frames of video information are recorded for example and issued as data indicative of the number of recording tracks for the jump operation, the counter 15 is operated as N-radix notation counter by the operation of the radix control circuit 17 while the output of the counter switches to a high level. Under this condition, the loop switch 9 is also opened and the drive signal supplied thereto having a polarity suited for the normal or reverse direction of the track jump operation, is issued from the jump signal generating circuit 16. As a result, the tracking actuator in the pickup device 3 is forcibly operated and the information reading point is jumped to adjacent tracks in turn. Further, a pulse signal is produced at the wave form shaping circuit 13 for each track jump movement of the information reading point. This pulse signal is supplied to the counter 15 as the clock input signal. Therefore, the count value of the counter 15 reaches N when the pulse signal is generated N times, and the output signal of the counter 15 then switches to the low level. Therefore, the servo loop switch 9 is closed while generation of the drive signal is stopped to start the normal reading operation.

Figure 2:
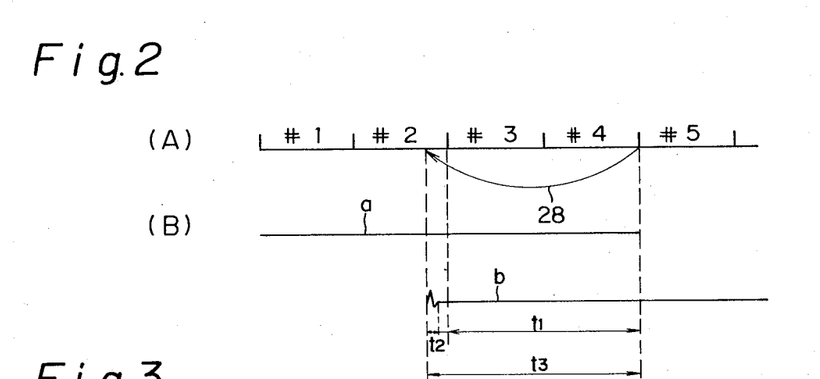

Referring to FIG. 2, operation will be further explained. With a recording disk on which frames from #1 through #5 are in turn recorded as shown at (A) and still picture playback operation for frames #3 and #4 is in effect during playback of the frame #4, the information reading point is moved in one direction by the jump operation, denoted by reference numeral 28, to a position just before the frame #3 in accordance with the operation of the radix control circuit 17. By operation of the radix control circuit 17, the time period $t_3$ required for picking up the information on the portion of the disk over which the information reading point is moved by the track jump operation, is determined to be longer than the sum of a time period $t_1$ for picking up the information on the two frames #3 and #4, and a time period $t_2$ required for stabilization of the time base servo circuit in a locked state. With this operation and no time base error being present before the track jump operation as shown by solid line at (B) in FIG. 2 and the time base error being present immediately after the track jump operation for the time period $t_2$, as shown by solid line b, the time base servo system will be stabilized before the time period $t_1$ for picking up the information in the two frames #3 and #4, without time base error. On the other hand, the information playback system is arranged so that the video signal corresponding to two frames is recorded once in the memory device 8 and in turn read out therefrom. The next video signal is in turn entered into the memory device, at each address from which the recorded video signal has been read out. Therefore, if the video signal corresponding to frame #3 and beyond is entered into the memory device after a track jump operation, good quality reproduction of a still picture is enabled by the video signal read out from the memory device because the video signal corresponding to frames #3 and #4 entered into the memory device after the track jump operation, has no time base error. Moreover, since the video signal of two frames is played back repeatedly, the phase after the track jump operation is stable color reproduction is made possible.

Figure 3:
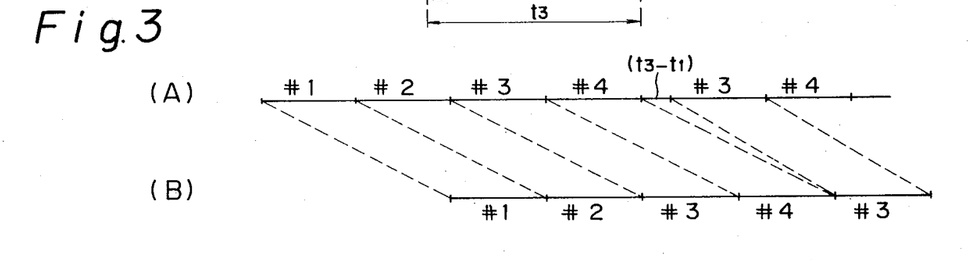

In addition, as diagrammed at (A) in FIG. 3, the frames #1 through #4 are in turn written into the memory device 8. Such writing operation is stopped for a time period ($t_3$—$t_1$), and then resumed with respect to the frames #3 and #4. At the same time, the frames #3 through #4 are in turn twice read out in succession as diagrammed at (B) in FIG. 3. As such, the reproduction of a still picture is effected by use of a memory device 8 having a capacity for recordng the video signal corresponding to two frames.

Figure 4:
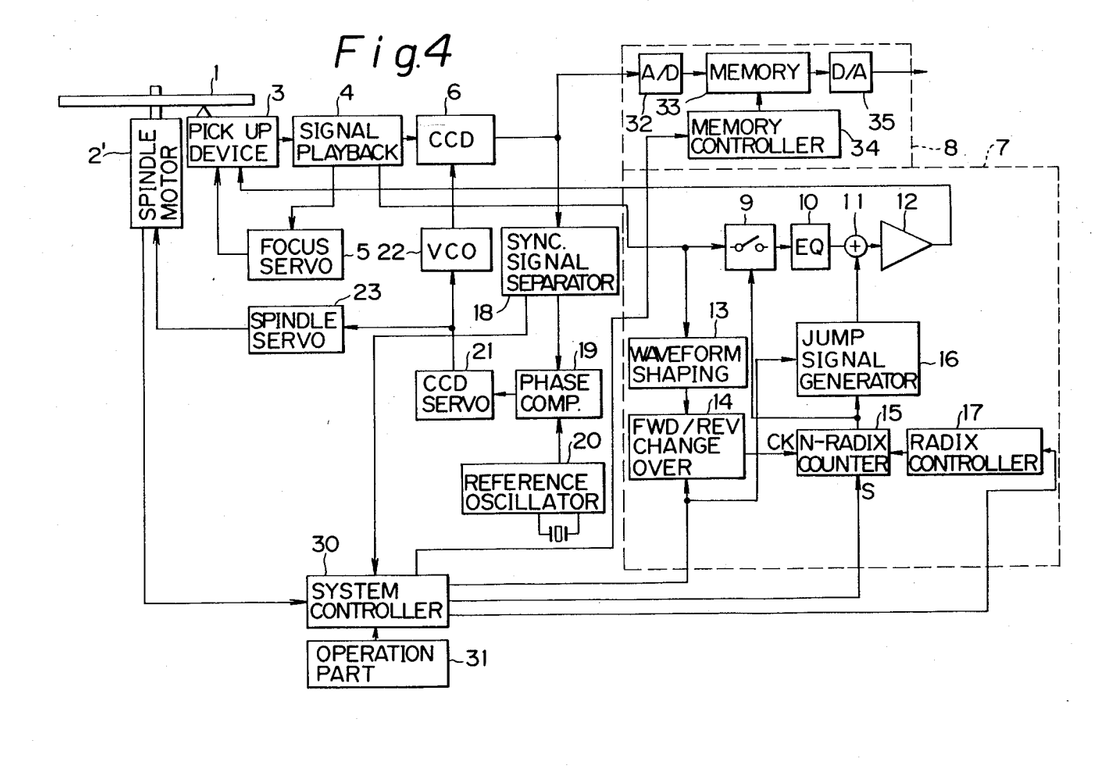
FIG. 4 is a block diagram of an information playback system in accordance with a second embodiment of the invention.
Figure 5:
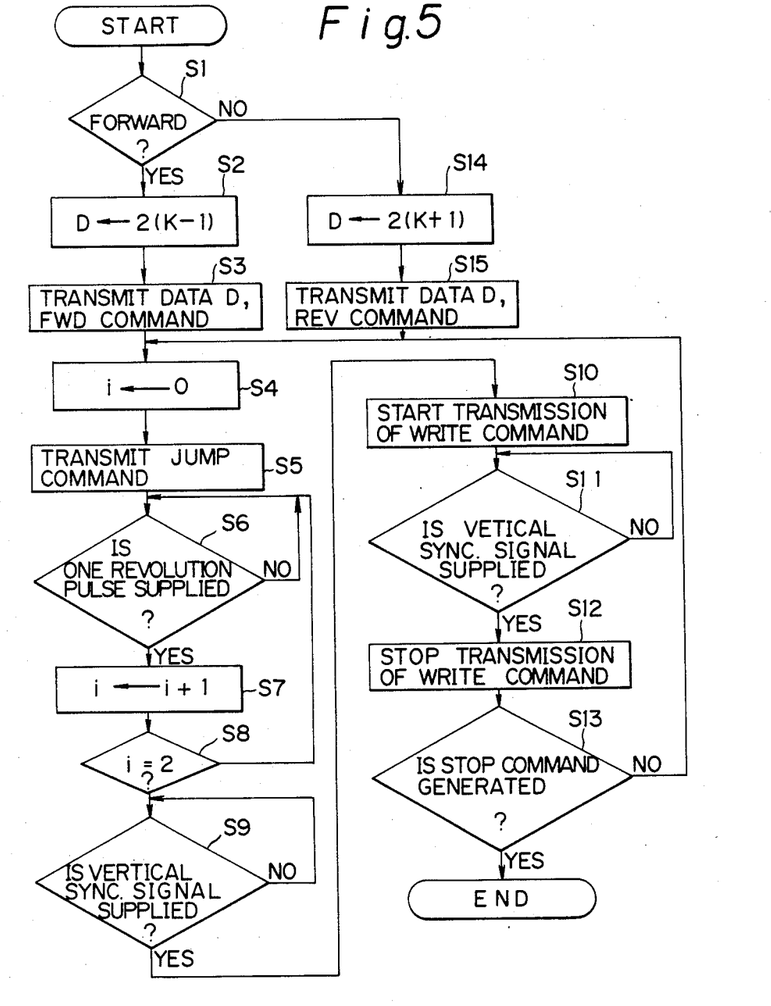
FIG. 5 is a flow chart diagramming an operational program of the system shown in FIG. 4.
Figure 6:
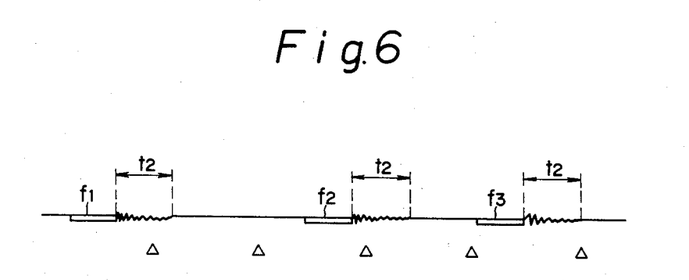
FIG. 6 is a diagram illustrating the functioning of the system of FIG. 4.

Referring to FIGS. 4–6, the present invention will be further explained by way of example, wherein memory device 8 has a capacity for recording the video signal corresponding to one field. In FIG. 4, the recording disk 1, the pickup device 3, the signal playback circuit 4, the focus servo circuit 5, the CCD 6, the tracking servo circuit 7, the memory device 8, the synchronizing signal separator 18, the phase comparator 19, the reference oscillator 20, the CCD servo amplifier 21, the VCO 22, and the spindle servo amplifier 23 are arranged and connected in the same manner as hereinbefore explained with reference to FIG. 1. However, the spindle motor 2' used in the system diagrammed in FIG. 4, incorporates a pulse generator which produces a pulse signal (one revolution pulse) each revolution of its shaft. This pulse generator, for example, includes a disk with a slit in its periphery, the disk being fixed on the shaft of the spindle motor 2'. By eradiating the periphery of the disk with a slit therein by a light beam and detecting the light passed through the slit by means of a photo-sensing element, the one revolution pulse signal is generated. The one revolution pulse signal generated by the pulse generator associated with the spindle motor 2', is supplied to a system controller 30. The system controller also receives the vertical synchronizing signal and address data supplied from the synchronizing signal separator 18 and various commands and data supplied in accordance with key operations of an operation part 31. By the address data supplied through the synchronizing signal separator, the system controller determines the position of the information reading point along a radial direction on the recording disk. The system controller 30, for example, includes a microcomputer which comprises a processor, a ROM, and RAM. In the system controller 30, the processor issues the FWD command, the REV command and the jump command to the tracking servo circuit 7, the data indicative of the number of recording tracks for the track jump operation and the write command to the memory device 8 in accordance with a program which is previously stored in the ROM. Further, the radix notation control circuit 17 is arranged to generate a control signal corresponding to the number of the recording tracks indicated by the data from the system controller 30. In the memory 8, the output signal of the CCD 6 is supplied to the A/D converter 32. The A/D converter 32 samples the output data of the CCD 6 in accordance with a sampling pulse signal having a predetermined frequency, and converts the sampled value to digital data. The digital output data of the A/D converter 32 is supplied to a memory 33. The address control and the mode control operations for the memory 33 are performed by a memory control circuit 34. The memory control circuit 34 is arranged to perform the address control and the mode control operations so that data stored in each address of the memory 33 is in turn read out from a lead address and new data is in turn written into each address starting from the lead address in accordance with the write command from the system controller 30. The data read out from the memory 33 is converted into an analog signal at the D/A converter 35 to reproduce the video signal.

Based on the foregoing, the processor of the system controller 30 operates in a manner explained hereinafter with reference to the flow chart diagram of FIG. 5. During the execution of operations of a main routine, if fast speed playback multiplied by a natural number K, is commanded by a user through a key operation of the operation part 31, the operation of the processor proceeds to a step $s_1$ for detecting playback in a forward direction. If the direction of playback is so detected at the step $s_1$, the program proceeds to a step $s_2$ in which a number obtained by subtracting 1 from K is multiplied by 2 and a value so obtained is issued as a data D indicative of the number of tracks for the track jump operation. The multiplier value (2) used in the step $s_2$ may be varied by the operation of the system controller 30 so that it depends on the radial position of the reading point on the recording disk. Then in step $s_3$, the data D indicative of the number of the recording tracks and the FWD command are transmitted to the tracking servo circuit 7, after which the program proceeds to a step $s_4$ in which data i to be stored in a predetermined address of the RAM is made equal to zero. Then, the processor supplies the jump command to the tracking servo circuit 7 at a step $s_5$. Subsequently, at a step $s_6$, generation of one revolution pulse by the spindle motor is detected. If it is determined that the one revolution pulse is not produced at the step $s_6$, the processor repeatedly performs the operation of the step $s_6$ and the program proceeds to a step $s_7$ in which 1 is added to the data i, only when the generation of the one revolution pulse is detected at step $s_6$.

Thereafter, the program proceeds to a step $s_8$ in which equality between the data i and 2 is detected. If it is detected that the data i is not equal to 2 at the step $2_8$, the program again goes to the step $s_6$. When it is detected that the data i is equal to 2 at the step $s_8$, the program proceeds to a step $s_9$ in which generation of the vertical synchronizing signal by the synchronizing signal separator 18 is detected. If it is detected that the vertical synchronizing signal is not generated by the synchronizing signal separator 18, the processor executes the operation of the step $s_9$ repeatedly, and the program proceeds to a step $s_{10}$ at which the transmission of the write command is begun, only when detection of the vertical synchronizing signal generated by the synchronizing signal separator 18, occurs. Then, the program proceeds to a step $s_{11}$ at which generation of the vertical synchronizing signal by the synchronizing signal separator 18 is detected. If it is detected at the step $s_{11}$ that the vertical synchronizing signal is not supplied from the synchronizing separator, the processor repeatedly performs the operation of step $s_{11}$ and the program proceeds to a step $s_{12}$ at which the transmission of the write command is stopped only when it is determined at the step $s_{11}$ that the vertical signal is supplied from the synchronizing separator 18. Then the program proceeds to a step $s_{13}$ at which generation of a stop command by a key operation of the operation part 31 is detected. If the absence of the stop command is detected at the step $s_{13}$, the program goes to the step $s_4$ again. On the other hand, if the stop command is generated at the step $s_{13}$, the processor restarts the operation of the routine already executed before the program returns to the step $s_1$.

Further, if it is detected at the step $s_1$ that playback is not in the forward direction, the program proceeds to a step $s_{14}$ at which 1 is added to K and the result is multiplied by 2. The value obtained by such multiplication is issued as the data D indicative of the number of tracks for the track jump operation. The multiplier value (2) used in the step $s_{14}$ may be varied by the operation of the system controller 30 so that it depends on the radial position of the information reading point on the recording disk. Then the program proceeds to a step $s_{15}$ at which the data D indicative of the number of the recording tracks and the REV command is transmitted to the tracking servo circuit 7, and the program proceeds to the step $s_4$.

In the steps 9–12 of the foregoing operation, the track jump operation is started after the video signals $f_1$, $f_2$, and $f_3$, corresponding to one field, are respectively written as diagrammed in FIG. 6. The time base error is present for the time period $t_2$ after the start of each track jump operation. Further, after a track jump operation, the next track jump operation will not be started until two one-revolution pulses generated at times indicated by the mark $\Delta$ in FIG. 6 are detected during steps $s_6$ through $s_8$ and the reading of the video signal corresponding to one field from the recording disk and the writing of the video signal into the memory, are completed.

In order to perform a fast speed playback operation K times in the forward direction, it is necessary that the information reading point be advanced $K-1$ tracks by the track jump operation while one revolution of the recording disk occurs. On the other hand, in order to perform a fast speed playback operation K times in the reverse direction, it is necessary that the information reading point is returned $K+1$ track by the track jump operation while one revolution of the recording disk occurs.

In the case of a CLV type video disk, the innermost part of the recording track contains the video signal of slightly more than two fields within each circumferential section. On the other hand, the time $t_2$ required for the time base servo circuit to be stabilized after a track jump operation, has a value of almost 10 milliseconds. Therefore, if the track jump operation is performed in the innermost part of the CLV time recording disk, there is a possibility that the video signal corresponding to one field without time base error cannot be obtained within the time period of one revolution of the recording disk after the start of the track jump operation.

However, in the system of FIG. 4, after start of one track jump operation, the next track jump operation will not be started until the video signal corresponding to one field is obtained following the supply of the one revolution pulse, twice. Further, the video signal corresponding to one field obtained after the generation of two one-revolution signals is stored in the memory. Therefore, the video signal corresponding to one field without the time base error can be obtained and the video signal without time base error having the length of one field is written into the memory. Thus, sufficiently good playback pictures will be obtained also under fast speed playback operation repeated K times.

In the latter condition of the system, the track jump operation is started every two revolutions of the recording disk. Therefore, the interval between the track jump operations is prolonged. However, since the distance traveled by the information reading point of the pickup device 3 during one track jump operation is doubled, the number of recording tracks per revolution of the recording disk under the track jump operation satisfies the condition for the K number of fast speed playback operations.

The present invention has heretofore been described, by way of example for the playback of a still picture using a memory device 8 having a recording capacity for storing the video signal of two fields, and the K fast speed playbacks with a memory device 8 having a recording capacity for storing the video signal of one field. However, it should be appreciated that the above examples are not restrictive of the present invention, which is applicable to both playback of a still picture and the fast speed playbacks with the memory device having another memory capacity.

It will be appreciated from the foregoing that according to the present invention, operation of the time base servo system is stabilized before the information to be recorded in the memory is picked up after a track jump operation. Therefore, the error time base is eliminated from the playback video signal and it becomes unnecessary to provide a separate time base servo circuit. Thus, the video signal having a stable time base is obtained from the memory and the operation of special playback modes may be performed in a very stable manner.

Figure 7A:
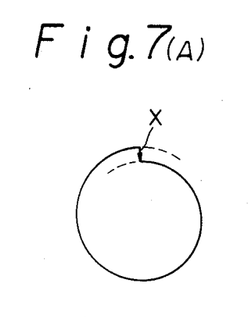
Figure 7B:
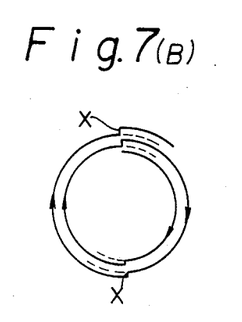
Figure 7C:
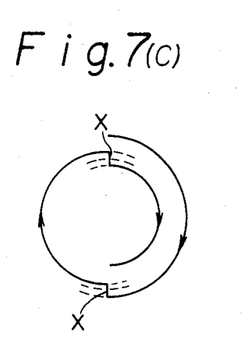

FIG. 7 diagrams the movement of the information reading point when several special playback operations are performed with the CAV type video disk in which two fields of the video information are recorded for each one revolution of the disk. As schematically shown with respect to the three examples (A), (B) and (C) in FIG. 7, the track jump operation is performed at portions (x) of the recording track in which the vertical synchronizing signal between two fields of the video information is recorded. Such examples respectively relate to a still picture playback operation, fast speed playback operations in the forward direction and fast speed playback operations in the reverse direction.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method for playing back information recorded on a non-CAV type recording disk, said method using a pickup device having an information reading point and a memory device having a memory capacity for recording information corresponding to at least one field of video signal, comprising the steps of: radially moving said information reading point relative to the recording disk by a track jump operation repeatedly at intervals of N rotations of said recording disk across M recording tracks on said recording disk, in response to a special playback command wherein N is a real number and M is a multiple of N; writing predetermined portions of information picked up by said pickup device during periods between each of said track jump operations into said memory device, in order; and reading information stored in said memory device in succession, to provide playback information, said information reading point being positioned by said radial moving step to a location on the recording disk enabling stabilization of a time base error in the information caused by said track jump operation, during a time period preceding said writing step.

2. A method as set forth in claim 1, further comprising a step for determining direction of said radial movement of said information reading point from data in said special playback command.

3. A method as set forth in claim 1, wherein said special playback command corresponds to a still picture playback operation, anad wherein said radial moving step returns said information reading point across N recording tracks by repeated performance of said track jump operations at intervals of N rotations of said recording disk.

4. A method as set forth in claim 1, wherein said special playback command corresponds to performance of K fast speed forward playback operations, K being a real number said radial moving step moving said information reading point in a forward direction across N (K+1) recording tracks by said repeated track jump operations and wherein said reading step is performed while predetermined portions of said information is written during said writing step.

5. A method as set forth in claim 1, wherein said special playback command corresponds to performance of K fast speed reverse playback operations, K being a real number, and wherein said radial moving step moves said information reading point in a reverse direction across N (K−1) recording tracks by said repeated track jump operations at intervals of N rotations of said recording disk, said reading step being performed while predetermined portions of said information is written during said writing step.

6. A method as set forth in claim 1, wherein said number N is varied according to said location of said information reading point on said information recording disk.

7. A system for playing back information recorded on a non-CAV type recording disk, said system using a pickup device having an information reading point, tracking control means connected to the pickup device for effecting track jump operations and a memory device having a memory capacity for recording information corresponding to at least one field of video signal, comprising: means responsive to a command corresponding to a special playback operation for radially moving said information reading point of said pickup device as a result of said track jump operations relative to said recording disk repeatedly at intervals of N times of rotations of said recording disk across M recording tracks on said recording disk, means for writing predetermined portions of the information picked up by said pickup device during periods between each of said track jump operations into said memory device, in order; and means for reading the information stored in said memory device in succession, to provide playback information for said special playback operation, said radial moving means including means determining the position to which the information reading point is radially moved for enabling stabilization of a time base error in the information, caused by said track jump operations, during a time period preceding said writing of the information.

8. A system as set forth in claim 7, further comprising means for determining direction of said radial movement of said information reading point in accordance with data in said command.

9. A system as set forth in claim 7, wherein said special playback operation corresponds to a still picture playback, and wherein said radial moving means returns said information reading point across N recording tracks by said repeated track jump operations at intervals of N rotations of said recording disk.

10. A system as set forth in claim 7, wherein said special playback operation corresponds to K fast speed forward playbacks, and wherein said radial moving means moves said information reading point in a forward direction across N (K+1) recording tracks, and means for programming operation of said reading means while said predetermined portions of said information is written by said writing means.

11. A system as set forth in claim 7, wherein said special playback operation corresponds to K fast speed reverse playbacks, and wherein said radial moving means effects said movement in a reverse direction across N (K−1) recording tracks, and means for programming operation of said reading means while said predetermined portions of said information is written by said writing means.

12. A system as set forth in claim 7, wherein said number N is varied according to said positioning of said information reading point.

* * * * *